United States Patent [19]

Hashmall

[11] 4,194,937
[45] Mar. 25, 1980

[54] APPARATUS FOR PROCESSING HOOK AND EYE FASTENERS

[75] Inventor: Frank Hashmall, Far Rockaway, N.Y.

[73] Assignee: L. M. Rabinowitz & Co., Inc., New York, N.Y.

[21] Appl. No.: 951,986

[22] Filed: Oct. 16, 1978

[51] Int. Cl.² .................... B29C 27/08; B32B 31/00
[52] U.S. Cl. ................... 156/73.1; 156/580.1; 156/250
[58] Field of Search ............ 156/73.1, 250, 88, 580.1, 156/510

[56] References Cited

U.S. PATENT DOCUMENTS

| | | | |
|---|---|---|---|
| 3,853,671 | 12/1974 | Ausnit | 156/580.1 |
| 3,884,738 | 5/1975 | Hofius | 156/73.1 |
| 4,025,374 | 5/1977 | Spindler | 156/73.1 |

Primary Examiner—Douglas J. Drummond
Attorney, Agent, or Firm—Edward F. Levy

[57] ABSTRACT

An apparatus for processing hook and eye fasteners includes a tape feeding mechanism for advancing cloth tape, having hooks or eyes sewn thereon, a predetermined distance through the apparatus. An ultrasonic heat sealing assembly forms a double row of aligned heat sealed stitches on the tape leaving a short section unstitched to form a flap, and a cutting mechanism cuts the tape between the double row of heat sealed stitches, thereby forming individual cloth tape fastener sections having heat sealed edges with an opened unsealed section for insertion of the garment.

10 Claims, 13 Drawing Figures

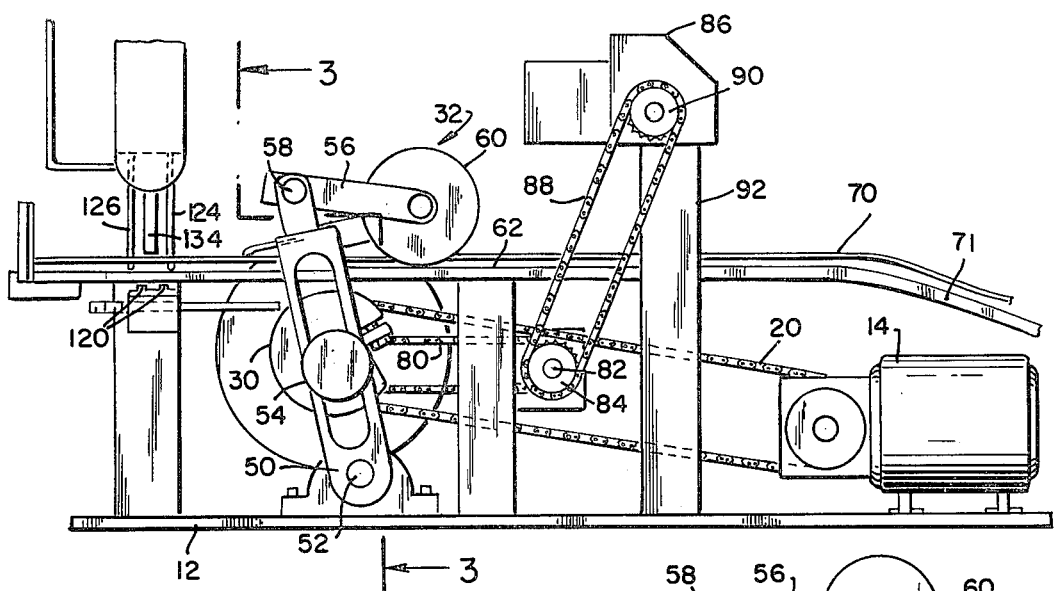
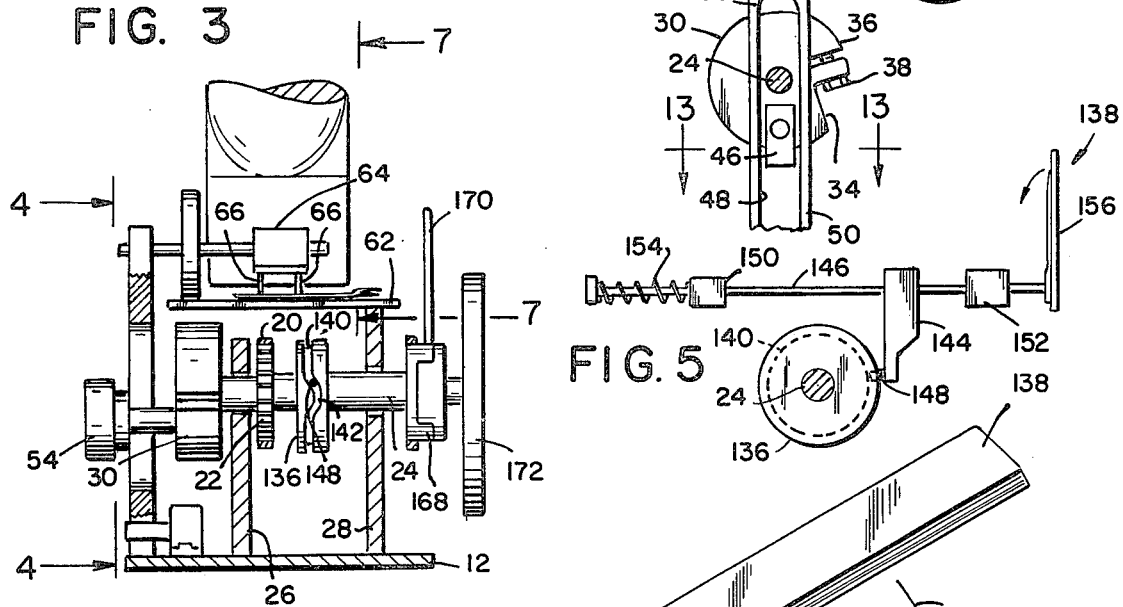
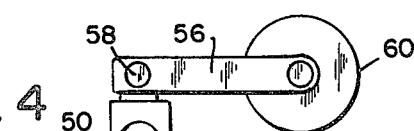
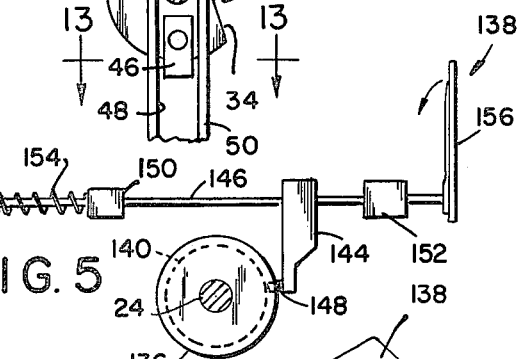
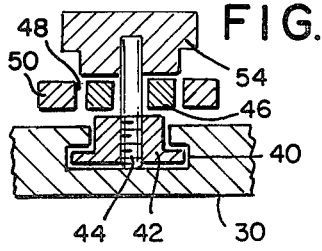
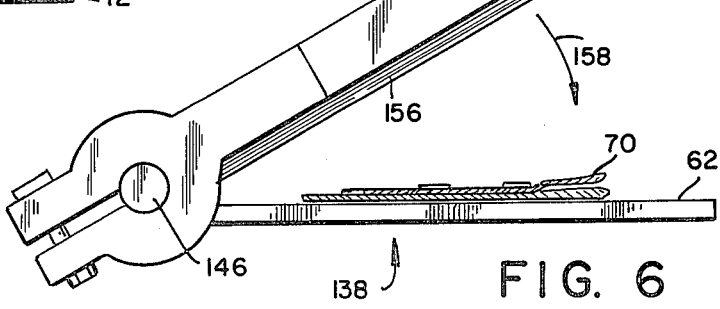

APPARATUS FOR PROCESSING HOOK AND EYE FASTENERS

In the manufacture of women's undergarments, notably brassieres, there is a continuing need for large quantities of hook and eye fasteners. In order to maintain relatively low manufacturing costs for such undergarments despite increased labor costs, the costs of all of the components of these garments must be carefully controlled. The present method of manufacture of these garments includes the individual steps of sewing hooks or eyes onto elongated cloth tapes, cutting the cloth tapes into individual sections having the required number of hooks or eyes, sewing the sections onto garments and sewing the cut edges of the sections to prevent unravelling or fraying of the edges of the tape. When the tape sections, with hooks and eyes thereon are received by a garment manufacturer, an operator must not only sew the tape sections on the garments, but must also sew a line of stitching along each of the tape sections, in a separate operation, to prevent fraying. This process involves an extensive amount of sewing and is both time consuming and costly.

Past attempts to reduce the amount of sewing in this process by using heat sealing equipment to seal the edges of the tape sections have been unsuccessful. The equipment required heretofore has been complex, incapable of high volume production and generally unreliable. In addition, the heat sealed edges produced by such equipment have been relatively stiff, resulting in dissatisfaction by the users and consequent rejection of the heat sealing process as an alternative to sewing.

It is an object to the present invention to provide an apparatus for processing hook and eye fasteners which utilizes ultrasonic sealing to reduce the amount of sewing required to manufacture garments incorporating these fasteners, and at the same time to provide an opening for insertion on the garment.

Another object of the present invention is to provide an apparatus for processing hook and eye fasteners which is able to accept cloth tapes having either hooks or eyes sewn thereon and process these tapes to provide tape sections having sealed edges at a relatively great rate.

Another object of the present invention is to provide an apparatus for processing hook and eye fasteners which may be easily adjusted to provide hook and eye fastener tape sections of any length desired.

Another object of the present invention is to provide an apparatus for processing hook and eye fasteners which provide means for automatically counting the tape sections processed.

Still another object of the present invention is to provide an apparatus for processing hook and eye fasteners which comprises relatively few parts which are simple, rugged and economical of manufacture, with the apparatus capable of reliable operation for extended periods of time.

In accordance with the present invention there is provided an apparatus for processing hook and eye fasteners which have been prepared by sewing hooks and the eyes onto different strips of cloth tape. The apparatus advances a tape, which has been placed therein, a predetermined distance, depending on the number of hooks or eyes required on each segment of tape. This apparatus forms a spaced double row of heat sealed stitches extending partially across the width of the tape and then cuts the tape between the double row of heat sealed stitches. The sections of tape are then deposited in a hopper. As the tape is processed, a counter is incremented thereby providing a running count of the sections of tape produced.

The apparatus includes a drive shaft mounted on a base and driven by an electric motor. The drive shaft includes an adjustable cam and rocker arm combination which operate feed fingers to advance the tape and a barrel cam which activates a cam shaft on which a knife is mounted. The drive shaft also drives a counter shaft which in turn drives a counter. The counter shaft includes a cam which activates an electric control circuit to operate an ultrasonic heat sealing horn and anvil combination which form the double row of heat sealed stitches. The barrel cam is configured so that the knife cuts the tape between the double row of heat sealed stitches thereby providing tape sections having heat sealed edges.

Additional objects and advantages of the invention will become apparent during the course of the following specification when taken in connection with the accompanying drawings in which:

FIG. 2 is a left side elevational view of the apparatus of FIG. 1, with upper portions of the apparatus broken away;

FIG. 3 is a fragmentary section taken along the line 3—3 of FIG. 2;

FIG. 4 is a fragmentary section taken along the line 4—4 of FIG. 3;

FIG. 5 is a side view of the knife actuating mechanism of the apparatus of FIG. 1 with the knife mechanism shown removed from the apparatus for clarity of illustration;

FIG. 6 is a fragmentary end view of the knife mechanism of FIG. 5, shown in use, with the knife about to cut a segment of cloth tape;

FIG. 13 is an enlarged cross-sectional fragmentary view of the driven cam showing mechanical connections to the rocker arm, taken along the line 13—13 of FIG. 4.

Figure 1:
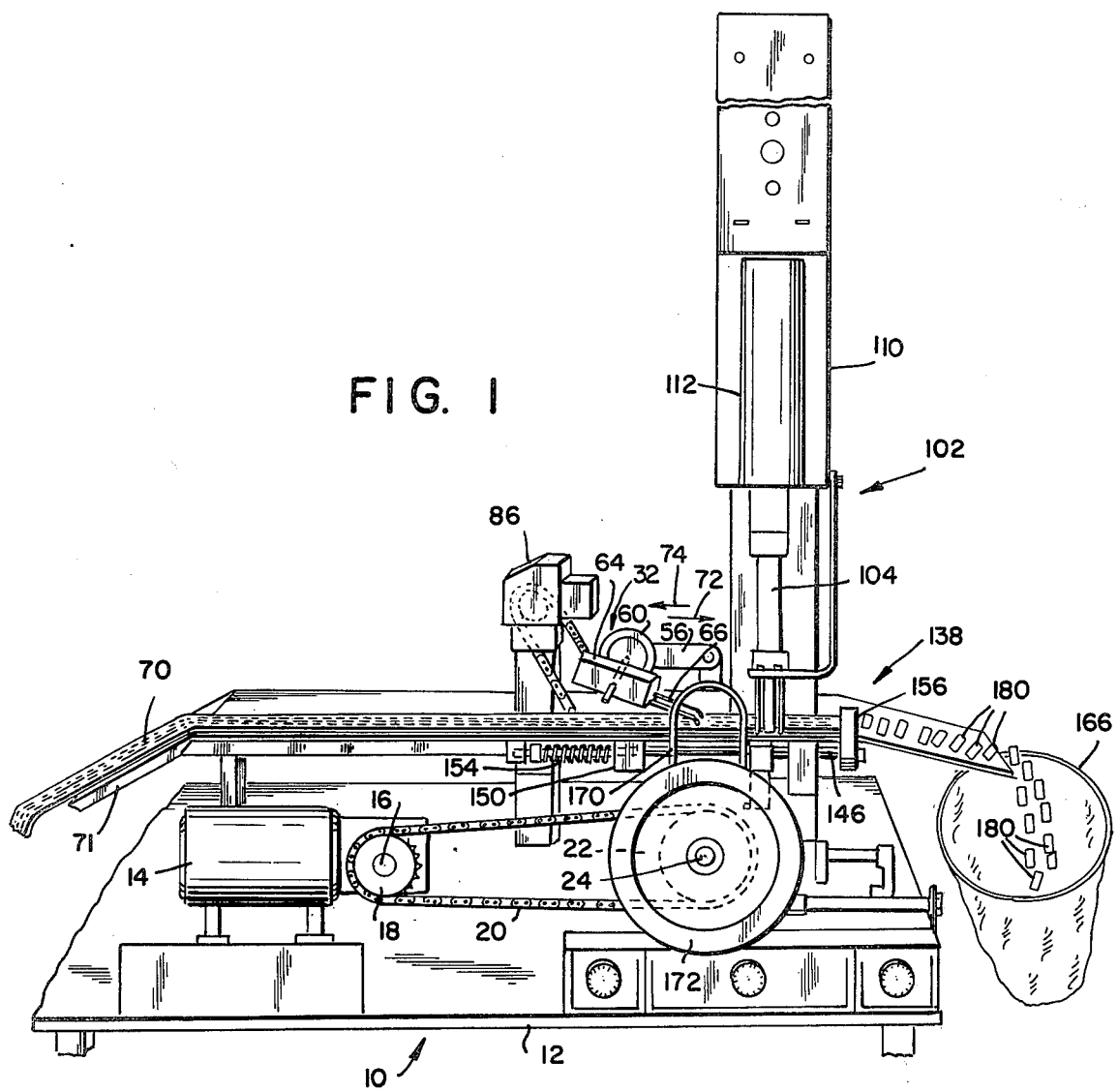
FIG. 1 is a right side elevational view of an apparatus for processing hook and eye fasteners according to the present invention, with the apparatus shown in operation, receiving cloth tape which has hook and eye fasteners sewn thereon, processing the tapes and delivering the tape segments to a hopper.

There is shown in FIG. 1 a machine 10 for processing hook and eye fasteners in accordance with the present invention, comprising a base 12 on which an electric motor 14 having a gear drive 16 is mounted. A sprocket wheel 18 is mounted on the gear drive 16 and drives an endless chain 20 which is coupled to drive sprocket 22 keyed to drive shaft 24.

As shown in FIG. 3, the drive shaft 24 is rotatably mounted in supports 26, 28 which project upward from the base 12. Mounted on the drive shaft 24 there is a drive cam 30 which forms a portion of the tape feeding mechanism 32. The drive cam 30, which is best shown in FIG. 4, has a circular body formed with a notched portion 34 which is spaced close to a radial slot in the drive cam 30. A bolt 38 is threaded into the drive cam 30 and when tightened, tends to close the slot 36 thereby reducing the diameter of a central hole in the drive cam 30 through which the drive shaft 24 passes, thereby securely clamping the drive cam 30 onto the drive shaft 24.

The drive cam 30 is formed on its face with a radially-extending T-shaped slot 40 which is best shown in FIG. 13. A rectangular block 42, having a T-shaped cross-section complementing the shape of the T slot 40, is slidably mounted in the T slot 40. The block has a threaded opening which receives the threaded end of pin 44 which passes through a clearance hole in a straight-sided slider member 46. The slider member 46 rides in a rectangular slot 48 formed in a rocker arm 50. As shown in FIG. 2, rocker arm 50 is rotatably connected to the base 12 by means of a pivot pin 52. When the drive cam 30 rotates, the offset slider 46 rides in the elongated slot 48 of the rocker arm 50, and the latter rocks back and forth about the pivot pin 52. The stroke of the rocker arm 50 may be varied by loosening an enlarged head 54 secured to the pin 44, moving the block 42 and slider 46 either toward or away from the center of the drive shaft 24, and then tightening the head 54, which locks the position of the slider 46.

As shown in FIG. 2, the upper end of the rocker arm 50 is rotatably connected to a connecting link 56 by means of a pivot pin 58, and the connecting link 56 is, in turn, rotatably connected to the hub of a guide wheel 60 which rolls along the table surface 62 mounted above the base 12. A feed block 64 (FIGS. 1 and 7) is pivotally connected to the guide wheel 60 and a pair of slender finger members 66 project from the feed block 64. The feed block 64 is balanced so that the ends 68 of the fingers 66 rest on the cloth tape 70 being processed. The cloth tape 70 is guided from a supply source up a ramp 71 and along the table surface 62 toward the sealing and cutting apparatus at the forward end of the machine.

Figure 7:
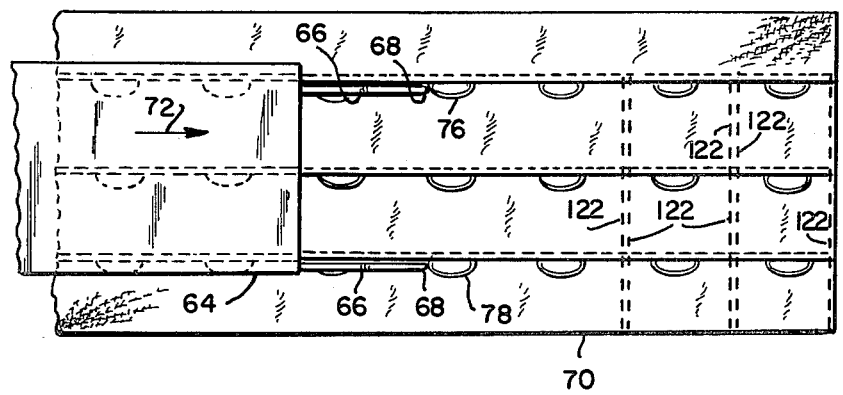
FIG. 7 is a top plan view of a section of cloth tape having sewn-in eye fasteners and being advanced by the apparatus, a portion of the tape section being shown with heat sealed stitches formed thereon.

When the drive cam 30 rotates, the rocker arm 50 oscillates, and the guide wheel 60 moves first in a forward and then in a reverse direction as shown by the arrows 72 and 74 in FIG. 1. When the guide wheel 60 moves in the forward direction, the feed block 64 also moves in the foward direction shown by the arrow 74 and the fingers 66 bear against the metal eyes 76, 78 on the cloth tape 70, as shown in FIG. 7, and advances the tape 70 a predetermined distance. When the feed block 64 reaches the end of the stroke and moves in the opposite direction, the fingers 66 ride over the eyes 76, 78 and the tape 70 remains stationary until the start of the next forward stroke, during which, the feed block again moves in the direction of the arrow 72 in FIG. 7 engaging another pair of metal eyes, and the tape 70 again advances. The distance through which the tape 70 advances is dependent upon the length of the stroke of the feed block 64, which is determined by the eccentricity of the sliders 42, 46 with respect to the drive cam 30.

FIG. 7 shows the fingers 66 bearing against the eyes 76, 78, on the tape 70. This has been shown by way of example, it being understood that the eye tape 70 may be replaced by a tape having hooks, with the operation of the apparatus 10 being identical to that described above.

The drive shaft 24 also drives an endless chain 80 (FIG. 1) via a sprocket wheel which is not shown. The chain 80, in turn, drives a counter shaft 82, which is rotatably mounted on the base 12, by means of a sprocket wheel 84 which is mounted on the counter shaft 82. The counter shaft 82 is connected to a counter 86 via a drive chain 88 and a sprocket wheel 90. The counter 86, which is mounted on a pedestal 92 projecting upward from the base 12, incrementally advances an odometer-type dial responsive to rotation of the sprocket wheel 90 by the drive chain 88. The dial provides a visual reading of the total number of sections of the tape 70 advanced through the machine. The counter shaft 82 also mounts a cam 94, which is best shown in FIG. 11.

Figure 8:
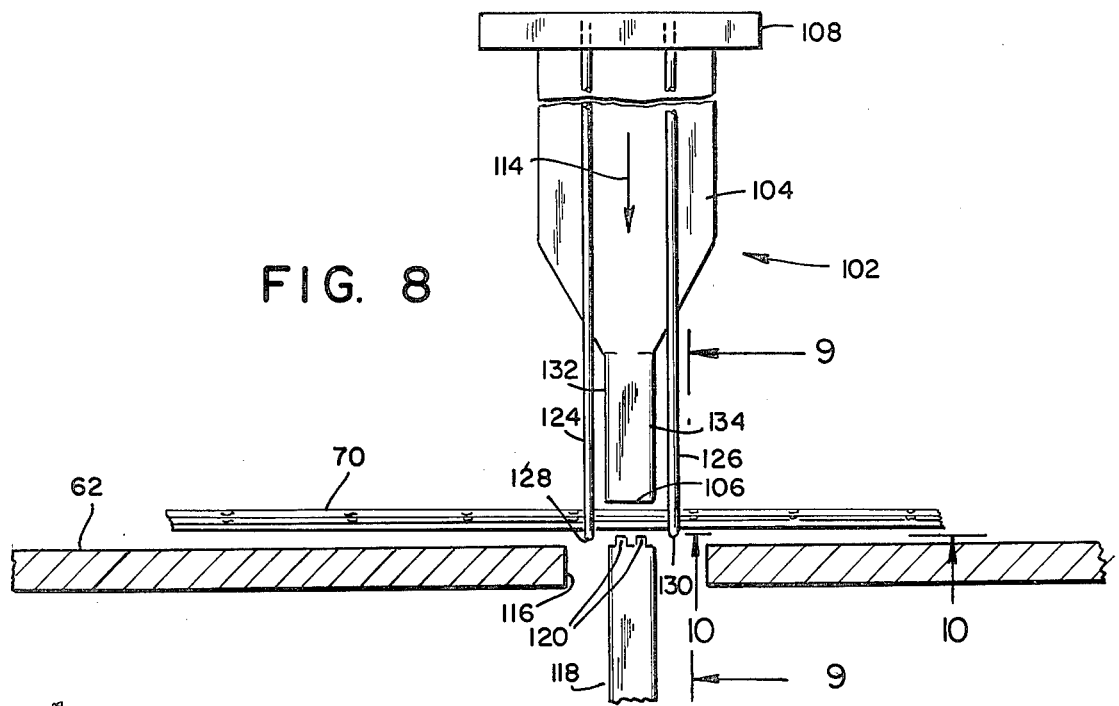
FIG. 8 is a fragmentary side elevational view of the ultrasonic heat sealing mechanism of the apparatus of FIG. 1 with the ultrasonic heat sealing mechanism shown in operation forming heat sealed portions on a cloth tape.
Figure 11:
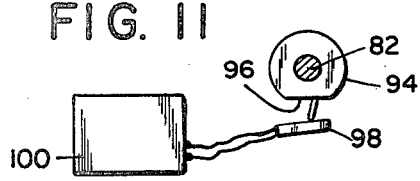
FIG. 11 is a fragmentary and partially schematic view of the counter shaft portion of the apparatus according to FIG. 1 showing the counter shaft and a cam mounted thereon removed from the apparatus, and activating a switch which is connected to a control circuit.

The cam 94 has a flat portion 96 which actuates an electrical microswitch 98 which is connected to a control circuit 100, indicated schematically as a block in FIG. 11. The control circuit 100 controls the operation of an ultrasonic heat sealing assembly 102. As shown in FIG. 8, the ultrasonic heat sealing assembly 102 includes a horn member 104 having a flat bottom 106. The horn member 104 projects downward from a plate 108 which is connected to a conventional ultrasonic vibration exciter 110 and a conventional hydraulic ram 112 which are shown schematically in FIG. 1.

Figure 9:
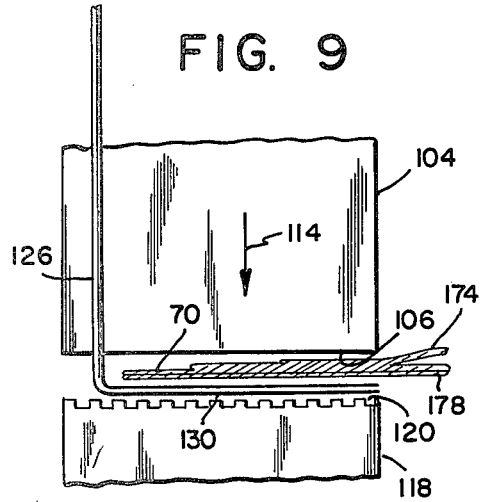
FIG. 9 is a fragmentary elevation view of the ultrasonic heat sealing mechansim as viewed along the line 9—9 of FIG. 8.

Actuation of the microswitch 98 causes the ultrasonic vibration exciter 110 to vibrate the horn 104 and also causes the hydraulic ram 112 to lower the horn 104 in the direction shown by the arrow 114 in FIG. 8, toward the table 62 on which the cloth tape 70 has been fed by the feeding mechanism 32. The table 62 has an opening 116, located directly below the horn 104 through which an anvil member 118 projects. The anvil member 118 is supported by the base and has two rows of upwardly-directed, evenly-spaced teeth 120. The teeth 120 have flat tops and the width of an individual tooth is approximately equal to the distance between adjacent teeth 120. The horn 104 presses the tape 70 against the anvil member 118, as shown in FIGS. 8 and 9 and the ultrasonic vibration of the horn 104 forms a double row of aligned heat sealed stitching on the cloth tape 70, extending in a transversion direction as indicated by the broken lines 122 in FIG. 10.

The thickness of each of the teeth 120 is substantially less than the width so that each of the heat sealed stitches is relatively elongated and narrow.

The horn 104 and anvil 118, according to the present invention, are proportioned and disposed with respect to the cloth tape 70 so as to form heat sealed stitching extending partially across the width of the tape 70 for reasons which will be presently described. A portion of the tape 70 overhangs the horn 104 and anvil 118 as shown in FIG. 9. It is obvious that in an alternative embodiment of the invention, an alternative horn and anvil member may be provided which form heat sealed stitching completely across the width of the tape, if so desired.

Projecting downwardly from the plate 108 are a pair of parallel vertical rods 124, 126, the lower ends of which terminate in respective horizontal arms 128, 130 which passes underneath the cloth tape 70 and serve to strip the tape from the rows of teeth 120 after the heat sealed stitching is formed.

The vertical rods 124, 126 are spaced slightly outwardly from the sides 132, 134 of the horn 104. After the completion of the heat sealing operation, the horn 104 is raised by the control circuit 100 and the horizontal stripper arms 128, 130 lift the tape 70 off the anvil 118, thereby preventing sticking of the tape 70 on the anvil 118.

As shown in FIG. 3, a cylindrical barrel cam 136 is mounted on the drive shaft 24 and operates the tape cutting mechanism 138 of the machine 10. The barrel cam 136 is circular and has a circumferential groove 140 formed in the surface thereof, which groove 140 includes a V-shaped portion 142. A cam follower 144, shown in FIG. 5, is mounted on a cam shaft 146 and has a projecting pin 148 which rides in the groove 140. The cam shaft 146 is rotatably mounted in support blocks 150 and 152, which are connected to the base 12. The cam shaft 146 passes through a compression spring 154 which urges the projecting pin 148 into contact with the groove 140. When the barrel cam 136 rotates, the follower pin 148 rides freely along the slot 140 until it enters the V-shaped portion 142, whereupon displacement of the cam follower 144 in a lateral direction causes a partial rotation of the cam shaft 146. A knife member 156, shown in FIG. 6, is mounted on the end of cam shaft 146 and is rotated by the latter in the direction shown by the arrow 158 in FIG. 6 to cut the cloth tape 70 which rests on the table 62. When the pin 142 of the cam follower 148 leaves the V-shaped groove portion 142, the cam shaft 146 rotates in the opposite direction and the knife member 156 moves away from the tape 70.

Each time that the heat sealing assembly 102 is actuated to impress a pair of parallel lines of sealed stitches 122 in the tape 70, the tape is advanced by one increment by the fingers 166. A section of the tape 70, formed with the lines of sealed stitches 122, therefore always extends from the heat sealing assembly 102 to the cutting mechanism 138. The cutting knife 156 is so located relative to the heat sealing assembly 102 that the knife 156 cuts off the free end section of the tape 70 with the cut being equidistant between a pair of parallel lines of sealed stitches 122, as will be presently described.

Figure 10:
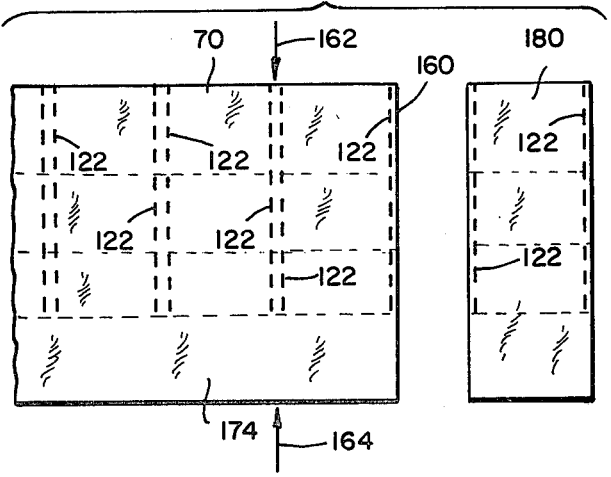
FIG. 10 is a fragmentary bottom view of the cloth tape being processed, as viewed along the line 10—10 of FIG. 8.

The cutting action just described is actuated by the barrel cam 136 which is rotated by the drive shaft 24. The operation of the ultrasonic heat sealing assembly 102 is controlled by the cam 94 which is driven by the drive shaft 24 through the drive chain 80 and the tape feeding mechanism 32 is also operated by the drive shaft 24 through the drive cam 30 and the rocker arm 50. In a simple, yet effective manner, the drive shaft 24 causes the operations of advancing, heat sealing and cutting the tape 70 to be performed in a timed relationship. This timed relationship is such that the tape 70 is cut between the double row of heat sealed stitches 122, as is shown diagrammatically in FIG. 10. FIG. 10 shows a bottom view of the free end portion of tape 70 which has just been cut along the edge 160, leaving a single row of heat sealed stitches 122 and providing a separated individual eye fastener 180. The tape 70 has been advanced past the location of the knife 156 and the knife 156 is about to again cut the tape 70, this time at the location shown by the arrows 162, 164, the cut being made midway between the adjacent lines of stitches 122. The cut individual eye fasteners 180 are then deposited in a hopper 166 as shown in FIG. 1. As described above, the stroke of the tape advance assembly can be easily adjusted to provide cut tape sections of various widths, and having two or three rows of hooks or eyes, rather than the single row of eyes mounted on the eye fastener 180.

The individual eye fastener 180 shown in FIG. 10 is thus formed with a row of heat-sealed stitches 122 along each of its side edges, to prevent fraying or unravelling in these areas, and in this finished condition it is supplied to the garment manufacturer. Thus, at the time that the eye fastener 180 is stitched to a brassiere or other garment, it is unnecessary for the sewing machine operator to also apply lines of stitching along the sides of the fastener as has been connectional practice.

The drive shaft 24 also includes a clutch mechanism 168 of a conventional nature, which is shown in FIG. 3 and which may be operated by the handle 170. Pulling upward on the handle 170 disconnects the drive shaft 24 from the power supplied by the electric motor 14 and permits an operator to adjust the various components or to insert additional supplies of cloth tape 70 when required while the motor is still running. A hand wheel 172 is mounted on the end of the drive shaft 24 and permits an operator to manually rotate the drive shaft 24, when disconnected from the electric motor 14 by the clutch 168, in order to check the operation of the apparatus 10.

Figure 12:
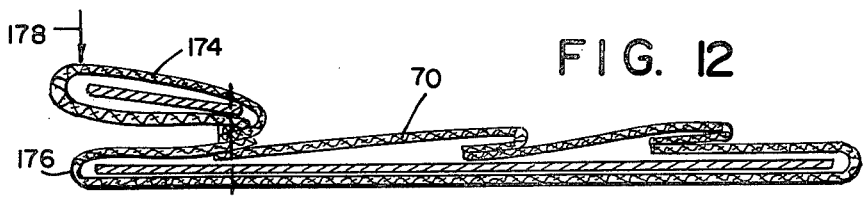
FIG. 12 is a cross-sectional view of the cloth tape processed by the apparatus of FIG. 1 drawn to an enlarged scale.

As previously indicated, an important feature of the invention is the manner in which the ultrasonic heat sealing assembly 102 is arranged to impress the rows of heat sealed stitching 122 only partially across the width of the tape 70, thereby leaving a short unstitched portion which provides a flap for subsequently attaching a brassiere or other garment to the fastener tape section. As shown in FIG. 9, when the tape 70 is fed through the apparatus below the horn 104, a short section, approximately one-quarter inch in length, projects beyond the horn 104 and the underlying teeth 120, so that when the horn is lowered into contact with the main body portion of the tape 70, this projecting portion is clear of both the horn 104 and the teeth 120, and the rows of stitching 122 are not formed thereon. Thus, as shown in FIG. 10, in the processed tape 70 the heat sealed stitches 122 formed by the apparatus 10 extend only partially across the width of the tape 70 and stop short of the lower portion thereof, as viewed in FIG. 10. The cloth tape 70 is conventionally manufactured in the multi-layer form shown in section in FIG. 12, so that the unstitched end portion of the tape provides a hinged flap portion 174, which is also shown in FIG. 9, as well as an opposed lower end body portion 176, both of which sections are free of stitching.

After the individual tape sections 180 are cut by the apparatus 10, as previously described, each tape section 180 may be joined to a garment by inserting a portion of the garment between the flap portion 174 and the lower end body portion 176 of the tape section and then sewing the tape section to the garment in the location shown by the arrow 178 in FIG. 10.

While a preferred embodiment of the invention has been shown and described herein, it is obvious that numerous additions, changes and omissions may be made in such embodiment without departing from the spirit and scope of the invention.

What is claimed is:

1. An apparatus for processing hook and eye fastener tapes, comprising a base, motor means mounted on said base, tape feeding means for incrementally advancing said tape on said base to a sealing station and then to a cutting station, ultrasonic heat sealing means mounted on said base at said sealing station for forming a double row of heat sealed stitches on said tape, each of said rows comprising a line of spaced heat sealed stitches, cutting means mounted on said base at said cutting station for cutting said tape into individual sections, with said cutting means disposed to cut said tape between said double row of heat sealed stitches, thereby forming individual tape sections having edges closed by respective lines of spaced heat sealed stitches, control means for controlling said tape feeding means, said ultrasonic heat sealing means and said cutting means for operation in a timed relationship, and driving connection means connecting said motor means and said control means.

2. An apparatus according to claim 1 in which said heat sealing means forms a pair of closely spaced parallel rows of aligned heat sealed stitches.

3. An apparatus according to claim 1 in which said tape feeding means comprises a drive shaft rotatably mounted on said base, a drive cam mounted on said drive shaft, a drive chain connecting said motor means and said drive shaft, a rocker arm having a first end pivotally connected to said base, adjustable connection means adjustably connecting an intermediate portion of said rocker arm and said drive cam, said connection means being adjustable to vary the eccentricity of said connection with respect to said shaft, and feed block means pivotally connected to a second end of said rocker arm and movable thereby in a reciprocating motion responsive to rotation of said drive shaft, said feed block means having a projecting portion engaging said tape and feeding said tape through said apparatus.

4. An apparatus according to claim 1 in which said ultrasonic heat sealing means comprises a shaft rotatably mounted on said base, a drive chain connecting said shaft and said drive shaft for rotation of said shaft responsive to rotation of said drive shaft, a control cam mounted on said shaft, electrical control means actuated by said control cam, an ultrasonic horn, actuator means for raising and lowering said ultrasonic horn, said actuator means being mounted on said base and electrically connected to said electrical control means, said electrical control means being operable to vibrate said ultrasonic horn and activate said actuator means to drive said ultrasonic horn toward and then away from said tape in response to rotation of said drive shaft.

5. An apparatus according to claim 4 which further includes anvil means mounted on said base and located opposite said horn means, said ultrasonic horn being positioned to press said tape against said anvil means when said horn is lowered.

6. An apparatus according to claim 5 in which said anvil means comprises a double row of tooth projections directed toward said tape.

7. An apparatus according to claim 1 in which said cutting means comprises a barrel cam mounted on said drive shaft, said barrel cam having a circumferential cam grooves, a cam shaft rotatably mounted on said base, a cam follower mounted on said cam shaft and having a projecting portion projecting into said cam groove for motion of said cam shaft responsive to said cam groove, spring means mounted on said cam shaft urging said cam follower into contact with said cam, and a knife member mounted on said cam shaft and disposed to rotate toward said tape to cut said tape, and then away from said tape, responsive to rotation of said barrel cam.

8. An apparatus according to claim 4 further comprising counter means mounted on said base, and drive chain means connecting said shaft and said counter means for actuation of said counter means responsive to rotation of said shaft, thereby providing a count of tape sections processed by said apparatus.

9. A process for providing hook and eye fastener tapes comprising the steps of incrementally advancing a cloth tape having hook or eye fasteners attached thereon along a base to a sealing station and then to a cutting station, forming at said sealing station a spaced double row of heat sealed stitches on said tape between said hookes or eyes, with each row comprising a line of spaced heat sealed stitches, and cutting said cloth tapes between said double row of heat sealed stitches at said cutting station, thereby providing cloth tape sections having edges sealed by respective lines of spaced heat sealed stitches.

10. A process for providing hook and eye tapes according to claim 9 in which in said step of forming a spaced double row of heat seals, said heat seals are formed extending partially across the width of said cloth tape, leaving an unsealed end portion of the tape to provide a flap which can be opened, whereby said cut tape section can be secured to a garment by inserting the garment between said flap and the opposed unstitched end body of the tape section.

* * * * *